United States Patent Office 3,533,936
Patented Oct. 13, 1970

3,533,936
HYDROCARBON CONVERSION
Paul B. Weisz, Media, Pa., assignor to Mobil Oil Corporation, a corporation of New York
No Drawing. Continuation-in-part of application Ser. No. 656,942, July 28, 1967, now Patent No. 3,413,212, which is a continuation of application Ser. No. 512,547, Dec. 8, 1965. This application Nov. 25, 1968, Ser. No. 778,845
The portion of the term of the patent subsequent to Nov. 26, 1985, has been disclaimed
Int. Cl. C10g 37/00
U.S. Cl. 208—56                              10 Claims

ABSTRACT OF THE DISCLOSURE

The invention relates to catalytic cracking of hydrocarbons in the presence of hydrogen donor materials with a catalyst composition which possesses a high hydrogen transfer selectivity. The catalyst comprises a crystalline aluminosilicate in combination with a porous, catalytically active matrix material.

CROSS REFERENCE TO RELATED APPLICATIONS

This application is a continuation-in-part of Ser. No. 656,942 filed July 28, 1967, now U.S. 3,413,212, which is a continuation of Ser. No. 512,547 filed Dec. 8, 1965, now abandoned, which in turn is a continuation-in-part of Ser. No. 242,372, filed Dec. 5, 1962, now abandoned.

This invention relates to the conversion of hydrocarbons and more particularly relates to the conversion of hydrocarbon feed stocks in the presence of a hydrogen donor material and a catalyst having high hydrogen transfer selectivity. In yet another aspect, this invention is directed to achieving enhanced product selectivity and product distribution by the mechanism of hydrogen transfer in the presence of a catalytic agent possessing enhanced characteristics for this purpose.

It is well known to convert petroleum oils boiling above 400° F. with a silica-alumina catalyst at temperatures in the range of from about 600° F. to about 1100° F. in order to crack the oils and secure petroleum oil fractions boiling in the motor fuel oil range.

One of the problems encountered from the very inception of the catalytic cracking art, and which had defied solution, at least at the origin of the trouble, is that "coke" is formed upon and contaminates the catalysts, thereby inhibiting the effectiveness thereof. "Coke" as formed during the cracking of hydrocarbons is usually considered empirically as carbon, but it is, in the most part, very highly condensed, hydrogen-poor hydrocarbons.

Gas-oil charging stock, as fed to the catalytic cracking systems, has a lesser proportion of hydrogen to carbon than the gasoline and gaseous products produced by the cracking operation. It follows, therefore, that some material of a nature more deficient in the proportion of hydrogen to carbon must come into existence when a sufficiently high conversion to such premium product is to be approached.

Catalytic cracking systems in use today have taken advantage of the coke deposition on the catalyst by burning off the "coke" to heat the catalyst to an elevated temperature suitable for recycle to the conversion step. Regeneration of the catalyst has proven, however, to be a rather complex procedure requiring costly equipment. On one hand, the "coke" has to be burned from the catalyst periodically so as to leave it to regain useful activity. On the other hand, the cracking catalyst employed is susceptible to heat damage at the temperatures which can develop during uncontrolled burning. Such damage is aggravated by the presence of water vapor at high temperatures. Such water vapor arises from the combustion of hydrocarbonaceous material deposited upon the catalyst. Purging or "stripping" of the catalysts is usually provided to assure more complete removal of any residual hydrocarbons entrained with the catalyst moving to the regeneration zone.

The problems associate with the burning of the coke on the catalyst makes it necessary to employ arrangements which dissipate the heat as formed rapidly from the catalytic material. Heat-transfer coils and the use of large amounts of excess air, or the recirculation of flue gas to dilute the incoming air have been utilized as expedients for this purpose.

In addition to the arrangements utilized to effect regeneration of the catalysts, much attenion has also been directed to the cracking step in an effort to avoid undesired buildup or deposition of coke on the catalyst before regeneration thereof to avoid an excessive release of heat detrimental to the catalyst, particularly if the regeneration is to be conducted within a reasonable economical time limit.

The problem of regenerating the catalyst is in fact so constraining that many catalytic cracking units now in existence are limited in their operating efficiency and capacity, not by the amount of charge that can be treated in the heater and reactor, but by the capacity of the unit for generating the catalyst by the removal of the "coke."

Research in the art of the catalytic cracking of petroleum has not only been directed to more efficient means of regeneration of the catalyst, but much work has been done in connection with the improvement of catalysts per se. In this connection, as referred to above, those skilled in the art have been accustomed to expect important but relatively minor advances in the efficiency of catalysts. As distinguished from the type of advances which the art has been accustomed to expect, research with respect to catalysts during the recent years has uncovered catalysts which have a relative activity of as high as ten thousand times that of the presently used amorphous silicious catalysts. In fact, it has been found that some of these catalysts are too active to be properly and usefully employed in the commercially existing catalytic cracking equipment now in use. Treatments have been developed for these active catalysts to render their use commercially feasible in existing processing steps and equipment without awaiting further developments in the art involving control and reduction of the activity to a level at which they may be immediately utilized in existing equipment and processes may, although still at a level much higher than the commercially available catalysts in use up to now.

It can be seen from the above discussion that it is necessary in present-day technology to maintain an economic balance between high conversions and good product distribution with low coke formation. It is also believed clear that it would be highly desirable to convert the catalytic cracking process under such conditions as to achieve maximum conversion while at the same time avoiding high coke make.

Prehydrogenation of charge-stocks prior to catalytic cracking has been used to improve the cracking operation with some improvement in gasoline yield and coke make.

It is an objective of the present invention to provide a process for converting hydrocarbons wherein there is obtained exceptionally greater conversion rates with good product selectivity.

It is a still further object of this invention to provide a process of catalytic cracking in which there is obtained an exceptionally advantageous combination of higher conversion rates, product selectivity and product distribution simultaneously.

It is a further object of this invention to provide a process for the catalytic cracking of hydrocarbons in the presence of a hydrogen donor material wherein there is obtained substantially improved product distribution.

Further objects and advantages of this invention will become more apparent from a reading of the following description.

This invention is therefore related to a conversion process involving the use of the highly active catalysts herein-described and adjusted to an activity level generally adaptable for use in present-day systems in which the step of hydrocarbon conversion reaction is controlled so as to significantly inhibit the formation of undesired "coke" deposition, to obtain both increased unit capacity due to a smaller regeneration load, as well as an improved product distribution.

"Conversion" may be expressed as the quantity of charge to the catalytic cracking process minus the amount of recycle, divided by the amount of charge. The "recycle" is defined as everything in the effluent boiling above gasoline. "Product selectivity" is a measure of the ability of the conversion process to make the desired product, gasoline, without unduly producing unwanted products. A convenient index which characterizes improvements in coke make and gasoline production may be had by dividing volume percent of gasoline produced by weight percent of coke produced in the same conversion. "Product distribution" is a more specific expression which indicates coke make, gas make and the content of various hydrocarbon materials in the product.

In the moving bed or fluidized bed reactor processes employed in the petroleum industry today the above-discussed "conversion," "product selectivity" and "product distribution" are directly dependent upon reaction conditions, i.e., temperature, pressure, space velocity, ratio of catalyst to oil passing through the reactor, concentration of coke on the incoming and outgoing catalyst and the nature of the catalyst or catalyst activity. In general, gasoline yields increase to a maximum point and thereafter decrease as cracking of the gasoline product occurs. Thereafter, higher conversion results in poorer product distribution with increased formation of coke and gas. To obtain higher yield of gasoline it is therefore the practice in the industry to operate at lower once-through conversion and thereafter recycle unconverted product.

In a more particular aspect, the present invention is directed to a method for effecting the catalytic conversion of a charge hydrocarbons in the presence of a hydrogen donor material and a highly active cracking catalyst having a hydrogen transfer selectivity substantially greater than heretofore known with conventional silica-alumina conversion catalysts. The term "hydrogen transfer selectivity" will be represented by the symbol $S_{HT}$ throughout the specification, and is a measure of the relative value of the hydrogen transfer activity of a particular catalyst as opposed to its catalytic activity for all other reactions taking place under specified reaction conditions with specified reactants. A second term which will be used hereinafter is "relative hydrogen transfer selectivity" $S_{RHT}$ which is the ratio of the hydrogen transfer selectivity of a specified catalyst to the hydrogen transfer selectivity of a control catalyst. As will be brought out in the following description, the process of the present invention is conducted in the presence of cracking catalysts having a relative hydrogen transfer selectivity greater than 1.0 and preferably at least 1.25.

The term "hydrogen transfer" is known in the art of catalytic conversion to characterize the ability to catalyze the transfer of hydrogen directly from one type of hydrocarbon to another, such as the direct transfer of hydrogen atoms between, for example, molecules of 1,2,3,4 - tetrahydronaphthalene (Tetralin) and hexane to produce naphthalene and hexane. This is to be contrasted to hydrogenation catalysts or catalyst components capable of attaching hydrogen to an olefin from gaseous moleculed hydrogen.

Before going into a more detailed explanation and description of the terms "hydrogen transfer selectivity" and "relative hydrogen transfer selectivity" as well as the means for empirically determining these values, it is well to first discuss a preferred group of highly active catalysts which are particularly suitable in the practice of the present invention. Generally, these preferred catalytic materials are zeolitic crystalline aluminosilicates, of either natural or synthetic origin having an ordered internal structure.

These zeolitic crystalline aluminosilicate materials are possessed of very high surface area per gram and are microporous. The ordered structure gives rise to a definite pore size, related to the structural nature of the ordered internal structure. Several different forms are known and available. For example, a 5 A. material indicates a material of A structure and a pore size of about 5 A. diameter; a 13X material is a faujasite structure with 10–13 A. pore diameter; and faujasites of a higher Si:Al ratio than about 1.8 have been termed Y zeolites.

Many of these zeolitic materials may be converted to what is known as an acidic form. For example, such a conversion may be had by ion-exchange with an ammonium ion, followed by heating to drive off $NH_3$ or by controlled acid leaching. In general, the H form is more stable in materials having Si/Al ratios, such a 1.8/1 or preferably above 2.7

One material of high activity is H Mordenite. Mordenite is a material occurring naturally as the hydrated sodium salt corresponding to the formula:

$$Na_8(AlO_2)_8(SiO_2)40 \cdot 24H_2O$$

This Mordenite material may be leached with dilute hydrochloric acid to arrive at an H or acid form of zeolite. In a specific example, the Mordenite material may be so treated as to have more than 50 percent in the acid form. A more complete discussion of "H" Mordenite may be found in copending application Ser. No. 142,778, filed Oct. 4, 1961.

Another type of high activity catalyst may be prepared by using Linde 13X molecular sieve, which is described in U.S. Pat. 2,882,244. This material may be base exchanged with a solution of rare-earth chlorides (containing 4 percent of $RECl_3 \cdot 6H_2O$) at 180–200° F. to remove sodium ions from the aluminosilicate complex and replace at least some of them with the chemical equivalent of rare-earth ions. After washing free of soluble material and drying, there is produced a REX aluminosilicate containing 1.0–1.5 percent (wt.) of sodium and about 25 percent (wt.) of rare-earth ions calculated as $RE_2O_3$.

Aluminosilicates which are used are well known and include synthesized aluminosilicates, natural aluminosilicates, and aluminonsilicates derived from certain caustic treated clays. Since the primary object of this invention is to provide a novel and unusual cracking catalyst, the aluminosilicate zeolite should have a pore size sufficiently large to afford entry and egress of the desired reactant molecules. In this regard, the crystalline aluminosilicates having a pore size greater than 4 and less than 15 Angstrom units are desired. Particularly preferred aluminosilicates are the faujasites, both natural and the synthetic X and Y types. Such aluminosilicates can be derived from caustic treated clays. Of the clay materials, montmorillonite and kaolin families are representative types which include the subbentonites, such as bentonite, and the kaolins commonly identified as Dixie, McNamee, Georgia, and Florida clays or others in which the main mineral constituent is halloysite, kaolinite, dickite, nacrite, or anauxite. Such clays may be used in the raw state as originally mined or initially subjected to calcination, acid treatment or chemical modification. One way to render the clays suitable for use is to treat them with sodium hydroxide or potassium hydroxide, preferably in admixture with a source of silica, such as sand, silica gel or sodium silicate, and calcine at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

| | |
|---|---|
| $Na_2O$/clay (dry basis) | 1.0–6.6 to 1 |
| $SiO_2$/clay (dry basis) | 0.01–3.7 to 1 |
| $H_2O$/$Na_2O$ (mole ratio) | 35–100 to 1 |

In accordance with this invention, the aluminosilicate active component of the catalyst composite may be varied within relatively wide limits as to aluminosilicate employed, cation character and concentration, as well as in the added components in the pores thereof incorporated by precipitation, adsorption and the like. Particularly important variables of the zeolite employed are the silica to alumina ratio, pore diameter and spatial arrangement of cations. The acidic property may be derived, as suggested above, from base exchange with solutions of acids or ammonium salts, the ammonium ion decomposing on heating to leave a proton. Polyvalent metals may be supplied as cations, as such or as spacing agents in acid aluminosilicates for stabilization. In addition to the rare-earth metals mentioned above, other suitable cations for exchange in the aluminosilicates include, for example, magnesium, calcium and manganese, and generally multi valent cations.

The above discussed catalysts possess activities too great to be measured by the "Cat. A" test discussed hereinafter. To measure their activity there has been developed a micro test method in which these catalysts are compared for relative cracking activity in the cracking of hexane with a conventional catalyst. This method and a fuller discussion of the development of the activity is described in an article Superactive Crystalline Aluminosilicate Hydrocarbon Catalysts from the Journal of Catalysts, volume 4, No. 4, August 1965. As therein explained, (alpha) is the measure of the comparative conversion ability of a particular superactive catalyst of the type discussed above when compared with a conventional high activity silica-alumina cracking catalyst (90% $S1O_2$–10% $A1O_2$) having an activity index as measured by the Cat. A test of about 46.

Many new superactive catalysts have been found to have an alpha ($\alpha$) value of the order of about 10,000 where alpha ($\alpha$) is the comparative activity of the catalyst based upon conventional amorphous silica-alumina cracking catalyst having an alpha value of one.

In order to use such high actiivty catalysts with conventional equipment and processes now available, particularly in the cracking of hydrocarbons, their activity can be adjusted or moderated.

One method for effecting the adjustment of activity may be referred to as steam-killing, or more shortly, steaming. It has been found that steaming can be utilized to acquire substantially any desired degree of activity reduction. For example, a crystalline aluminosilicate of the faujasite structure which has been base-exchanged with a mixture of rare-earth chlorides has a relative alpha activity, when freshly prepared of about 10,000. By controlled steaming in an atmosphere of steam for 5–40 hours, at 1300° F. its relative activity can be reduced to an alpha value in the range of from about 3 to 15.

Such high activity catalysts can also be modified in their activity by dilution in a matrix of relatively small or no activity. Matrix materials which can be used for this purpose include metals and alloys thereof, sintered metals and sintered glass, asbestos, silicon carbide aggregates, pumice, firebrick, diatomaceous earths, activated charcoal, refractory oxides, organic resins, such as polyepoxides, polyamines, polyesters, vinyl resins, phenolics, amine resins, melamines, acrylics, alkyds, epoxy resins, etc., and inorganic oxide gels. Of these matrices, catalytically active inorganic oxide gels are particularly preferred because of their superior porosity, attrition resistance, and stability under reaction conditions, especially those reaction conditions encountered in the cracking of gas oil. Inorganic oxide gels suitable for this purpose are fully disclosed in U.S. Pat. 3,140,253 issued July 7, 1964.

The catalytically active inorganic oxide matrix may also consist of a raw or natural clay, a calcined clay or a clay which has been chemically treated, e.g., with an acid medium or an alkali medium or both. The aluminosilicate can be incorporated in the clay simply by blending the two and fashioning the mixture into desired shapes. Suitable clays include attapulgite kaolin, sepiolite, polygarskite, kaolinite, plastic ball clays, bentonite, montmorillonite, illite, chlorite and halloysite. Of the foregoing group, kaolinite, halloysite and montmorillonite are preferred.

The matrix is combined with the aluminosilicate in such proportions that the resulting product contains a minor proportion of up to about 25% by weight of the highly active alumino-silicate component, preferably from 1% to 25% by weight in the final composite, while the porous catalytically active material constitutes the balance or the majority of the balance thereof. The incorporation of the aluminosilicate into the matrix can be accomplished either before, after, or during chemical base exchange treatment as well as before, during, or after activation of any of the components.

Thus, through combinations of the various methods of adjusting activity of the superactive crystalline aluminosilicate catalyst materials substantially any desired relative activity can be obtained. For example, a freshly prepared RE 13X of relative activity, $\alpha \approx 10,000$, reduced by steaming to a material of $\alpha \approx 10$, can be further reduced by compounding with an equal amount of catalytically inert material to an activity, $\alpha \approx 5$.

This invention involves, as stated hereinbefore, catalytic cracking in the presence of hydrogen donor materials and overcracking catalysts which have unusually high hydrogen transfer activity, and particularly a high hydrogen transfer selectivity. During hydrocarbon conversions over acidic catalysts, as in cracking operations, availability of high activity for hydrogen transfer reactions are believed to result in a marked improvement in the overall catalyst selectivity due to suppression of secondary reactions in which unsaturates would normally be transformed to coke. Use of cracking catalysts having a significantly higher hydrogen transfer to cracking rate ratio than conventional silica-alumina catalysts will thus result in superior product distribution, particularly in the presence of hydrogen donor type hydrocarbon materials.

In order to define and measure catalyst activity for hydrogen transfer as opposed to other reactions occurring during cracking, an empirical measurement test has been devised. By this test, not only can the activity of a catalyst for promoting hydrogen transfer be measured, as opposed to activity for promoting other reactions during cracking, but also the relative value of catalysts can be correlated by comparison with a standard control catalyst. Other reactions which occur during cracking operations beside hydrogen transfer include C—C scission, polymerization, condensation, aromatization, alkylation and coke formation, all of which other reactions are measured by difference.

In the testing method employed herein to define hydrogen transfer selectivity, a charge stock consisting of a 2:1 molar ratio of cyclohexane and pentene-2 is passed over a specific catalyst under particularly controlled conditions of temperature, liquid hourly space velocity, catalyst/oil ratio, time of run and rate of conversion. Formation of pentane is the criterion for determining the extent of the hydrogen transfer reaction occurring. The hydrogen for saturation of the pentene comes from the cyclohexane and from reactions such as pentene hydrogen transfer accompanied by creation of condensation products. Analysis of the products is accomplished by gas-liquid partition chromatography. By comparing the weight of pentane formed as to the amount of pentene-2 converted one may arrive at the comparative hydrogen transfer activity of the catalyst in comparison to the activity of the catalyst for all other reactions, i.e., the hydrogen transfer selectivity. Specifically, the following is determined:

(A) Weight percent pentene-2 converted
(B) Weight percent pentane formed
(C) Weight percent other reaction products (A–B).

This test system permits one to arrange the various catalysts in the order of their abilities to promote hydrogen transfer reactions relative to catalyzing other cracking reactions.

In order to provide a standard of evaluation of hydrogen transfer activity, the above generally described test procedure is conducted with a standard or control cracking catalyst having known physical and chemical characteristics as well as known catalytic activity. The catalyst which is chosen as a control is the conventional silica-alumina cracking catalyst widely used in the industry today. The control catalyst is an amorphous silica-alumina composition of 90 percent $SiO_2$ and 10 percent $AlO_2$ which has been base-exchanged to be essentially free of alkali metal and calcined. This silica-alumina catalyst may also be identified in terms of its catalytic cracking activity. This is accomplished by a standard evaluation test, widely established and used for the evaluation of hydrocarbon cracking catalysts, both for preliminary evaluation and for control during commercial use by examination of activity, which evaluation test is known as the "Cat A" activity test. In this test, a specified Light East Texas gas oil is cracked by passage over the catalyst in a fixed bed, at a liquid hourly space velocity (LHSV) of 1.0, using a catalyst-to-oil ratio (C/O) of 4/1, at an average reactor temperature of 875° F., and atmospheric pressure. The percentage of gasoline produced is the activity index (AI). The method of this test is described more fully in National Petroleum News, 36, page R–537 (Aug. 2, 1944). The control silica-alumina catalyst employed in the hydrogen transfer test hereinafter more specifically described as an AI value of about 46.

To describe more specifically now the testing system, the catalyst under investigation is placed in a refractory tube (Vycor) of 8 mm., outside diameter and is retained therein as a compact body by suitable porous plugs, such as of glass wool. This reactor tube is mounted in an electrically heated furnace having a 1 inch internal diameter, and being 6 inches long. Three cubic centimeters of catalytic material is placed in the reactor tube which is 12 inches in length. A thermocouple is inserted in the annular base surrounding the reactor, and the ends of the furnace are plugged with glass wool. At either end of the reactor tube a 3-way valve is provided. To introduce reactant, an inert gas such as helium is bubbled through a mixture of cyclohexane and pentene-2, present in a molar ratio of about 2:1 to carry the mixture in vapor form through the reactor. The 3-way inlet valve permits flushing before and after reaction, and also permits introducing regenerative gases, if desired, after a reaction is investigated. The 3-way valve at the outlet permits passing all of the effluent to a collection zone for sampling and analysis whereupon chromatographic analysis may be rapidly conducted. The amount of reactant mixture (pentene-2 and cyclohexane) carried in with the inert gas (helium) is controlled by the partial pressure of the reactant at the temperature of the reactant supply vessel and by the flow rate of the gaseous carrier.

Employing the apparatus described above, the test runs upon each catalyst were conducted at a catalyst temperature of 850° F. and at a fixed conversion rate of 80 percent and 85 percent of pentene. The results were expressed graphically by plotting B (wt. percent pentane formed)/C (wt. percent other reaction products) against A (wt. percent pentene converted). The fixed conversion rates were maintained for each catalyst by varying the liquid hour space velocity and the catalyst/oil ratio or time. In the following Table I there are listed the results obtained with a number of catalysts with the catalysts arranged in order of descending hydrogen transfer selectively listed in columns 1 and 2 under A. In columns 1 and 2 under B there is listed the relative hydrogen transfer selectively which consist of the hydrogen transfer selectivity adjusted to an assigned value of 1 for the control 46 AI silica-alumina catalyst, i.e., $S_{HT}$ catalyst/$S_{HT}$ control catalyst.

TABLE I.—EXTENT OF HYDROGEN TRANSFER REACTION CONVERSION OF PENTENE

|  | A | | B | |
|---|---|---|---|---|
|  | H-transfer selectivity a | | H-trans. selectivity adjusted to 46 AI Si/AL=1 | |
|  | At 80% conv. | At 85% conv. | | |
|  | Test Procedure b | | | |
|  | 1 | 2 | 1 | 2 |
| Fresh REX | 1.94 |  | 3.23 |  |
| Steamed REHY | 1.80 | 1.78 | 3.00 | 2.58 |
| Fresh REHX | 1.77 | 1.94 | 2.95 | 2.94 |
| Fresh REHY | 1.69 |  | 2.82 |  |
| Steamed REHX | 1.65 | 1.71 | 2.75 | 2.59 |
| Steamed REX | 1.64 | 1.76 | 2.73 | 2.67 |
| Fresh REX Bead | 1.07 |  | 1.78 |  |
| Steamed REX Bead | 0.93 | 0.72 | 1.55 | 1.09 |
| Fresh HY | 0.77 | 1.00 | 1.28 | 1.51 |
| Fresh Acid Mord | 0.75 | 0.66 | 1.25 | 1.00 |
| Fresh Si/Al | 0.72 |  | 1.20 |  |
| Fresh CaX | 0.67 |  | 1.11 |  |
| 46 AI Si/Al | 0.60 | 0.66 | 1 | 1.00 |
| Steamed Si/Mg | 0.57 |  | 0.95 |  |
| Fresh Si/Mg | 0.55 | 0.78 | 0.92 | 1.18 |
| Fresh $Al_2O_3$ | 0.55 |  | 0.92 |  |
| Steamed $Al_2O_3$ | 0.50 |  | 0.83 |  |
| Fresh NaY | 0.47 |  | 0.78 |  |
| Fresh NaX | 0.35 |  | 0.58 |  | a gr $C_5=$ $\dfrac{\text{gr. C3 Par. Formed}}{\text{converted minus gr } C_5 \text{ par. formed.}}$ b Test Procedure 1:30 min. run, Ave. Cat. Temp. 850° F., variable LHSV and Cat./oil; Test Procedure 2: Ave. Cat. Temp. 850° F., Cat./Oil 0.3, variable LHSV and time.

In the above table the symbols employed have the following significance: RE denotes rare-earth metal or mixtures of rare earth metals. X denotes a Linde 13X Molecular Sieve. Y denotes an aluminosilicate of Y types. Thus, REX indicates a rare-earth-exchanged 13X Molecular Sieve. The specific REX of the table contains about 25 weight percent of rare-earth ions calculated as $RE_2O_3$ and prepared in the manner described above. REHX indicates a Linde 13X Molecular Sieve which has been activated by exchange with rare-earth ions and ammonium ions. Similarly, REHY indicates a 13Y Molecular Sieve which has been exchanged with rare-earth and ammonium ions in the course of activation to obtain the final product. Similarly, HY indicates a molecular sieve which has been ion-exchanged to contain hydrogen and/or ammonium ions replacing the sodium ions in the course of activation. The word "steamed" before the catalyst indicates that this catalyst has been treated with steam in the manner previously described to reduce the extremely high initial catalytic cracking activity. The initial phenomenally high cracking activity and the need for reducing same by such means as steaming is more fully described in copending application Ser. No. 208,512. The term "REX bead" indicates that the denoted rare-earth-exchanged aluminosilicate is dispersed in a matrix of an inorganic silica-alumina gel in an amount of 5 percent by weight of the finished dried bead.

The bead form of catalyst is very desirable from the point of view of resistance to attrition, and may be prepared by dispersing the aluminosilicate in an inorganic oxide gel according to the method described in U.S. Pat. 2,900,349 to Schwartz, and then converting to a gelled bead as described in U.S. Pat. 2,384,946 to Marisic.

The material indicated in the table as acid mordenite is the previously described mordenite which may be leached with dilute hydrochloric acid to produce the H or acid form. The acid mordenite used in the tests was so treated as to have more than 50 percent in the acid or hydrogen form.

It will be noted upon examination of the data of Table I, that the hydrogen transfer selectivity varies with the level of conversion being effected. In the following discussion, when a relative hydrogen transfer selectivity of "greater than one" or "preferably at least 1.25" is used, it is to be understood that such numerical values are based upon the data taken at 80 percent conversion, columns designated 1 and 1 in Table I, and that the term "relative hydrogen transfer selectivity," by the method of test herein described, is relative to the selectivity of a conventional silica-alumina catalyst of 46 AI by the Cat. A test.

Accordingly, in a more specific embodiment, this invention involves the catalytic cracking of hydrocarbons in the presence of hydrogen donor materials over catalysts having a relative hydrogen transfer selectivity ($S_{HT}$) greater than one and preferably at least 1.25. The conditions of cracking which may be employed in the method of this invention include temperatures in the range of from about 550 to about 1100° F., preferably from about 800 to about 950° F. under pressure in the range of from sub-atmospheric pressure up to several atmospheres of pressure. The contact time of the hydrocarbon charge with the catalysts is adjusted in any case according to the conditions, the particular charge stock and the particular result desired to give a substantial amount of cracking to lower boiling products. In general, the liquid hourly space velocity of the charge may be in the range of from about 0.2 to about 4.0, preferably from about 0.5 to about 2.0 based on total solid; but with some of the high cracking activity catalysts employed in this process, e.g., rare-earth-exchanged faujasite materials the space velocity may run much higher while still obtaining acceptable conversion and good yields. The catalyst oil ratio employed may also be widely varied, in the range of from about .2 to about 4. based on total solid, or less than about .2 when based on the very active crystalline aluminosilicate materials.

The term hydrogen donor materials, as used in this invention, refers to compounds which readily release hydrogen to unsaturated, olefinic hydrocarbons in a cracking zone without dehydrogenative action, i.e., without substantial production of molecular hydrogen per se. The hydrogen donor molecules thus converted to more unsaturated compounds can be rehydrogenated with molecular hydrogen in a separate hydrogenation zone in the presence of a hydrogenation catalyst. Among suitable hydrogen donor materials there may be mentioned hydroaromatic, naphthene-aromatic and naphthenic compounds such as hydronaphthalenes, for example Tetralin, hydroanthracenes, decahydronaphthalene (Decalin) and the like. Compounds having at least 1 and preferably 2, 3 or 4 aromatic nuclei and being partially hydrogenated to include aromatic resonance and containing olefinic bonds serve as excellent hydrogen donors. Fully aromatic structures are ineffective as hydrogen donors. Completely hydrogenated condensed ring molecules have only a small hydrogen transfer propensity. Therefore hydrogen donors are preferentially created by partial hydrogenation of polynuclear aromatics to introduce on the average from about 1 to about 3 hydrogen molecules, leaving at least one ring partially hydrogenated.

The hydrogen donor materials may be added to the charge stream from external sources. It is preferred, however, to derive the donor material from hydrocarbon fractions that have undergone substantial cracking and are, therefore, highly aromatic and refractory. These materials are then added as donors to the cracking feed after partial hydrogenation thereof.

In a continuous cracking operation it is advantageous to recover an aromatic rich fraction containing potential hydrogen donor material from the cracking effluent itself, as by fractionation, prepare hydrogen donor material therefrom by partial hydrogenation and thereafter passing the hydrogenated aromatic material to the cracking step with the hydrocarbon feed to be converted.

Other sources of aromatic-naphthenic hydrocarbons that may be partially hydrogenated for use as hydrogen donors in the method of this invention include thermal tars obtained by thermal cracking of catalytic cycle stocks, extracts of catalytic cycle stocks, heavy cycle stocks themselves, or bottoms from catalytic cracking. The preferred fractions of recycle stocks have a boiling range of 400–1000° F. and preferably 550–700° F. or 700–1000° F. Heavy charge stocks, coker gas oils, recycle stocks, etc., having a hydrogen content below about 11.3 or preferably below 10.5 percent are suitable since such low hydrogen content indicates the presence of substantial aromatic and aromatic-naphthenic portions which upon partial hydrogenation serve as good hydrogen donors. Also it will be particularly advantageous to add hydrogen donor material to the charge stock so as to result in a total hydrogen content of 12 wt. percent or more in the resulting charge mixture.

Though the above discussion has been with regard to the addition of hydrogen donor materials to gas oil and other cracking feed stocks, it is also contemplated that the feed stocks themselves, in many cases, may be partially hydrogenated before cracking thereof. The partially hydrogenated donor materials may constitute from about 5 to about 50 percent by volume of the feed stocks.

Hydrogenation of the donor material may be accomplished by methods well known in the art wherein the material to be hydrogenated is passed with hydrogen over any suitable hydrogenation catalyst, at hydrogenation conditions.

It is contemplated, however, to limit the degree of hydrogenation so as to preserve a substantial amount of aromaticity in the thus treated product. Thus the moler quantity of total aromatics should preferably not be reduced by more than 25%, and more preferably, by not more than 12%.

Reference is now made to the following specific examples for purposes of more clearly illustrating the invention.

Two refractory gas oil stocks were partially hydrogenated at relatively conventional hydrogenating conditions over a suitable hydrogenating catalyst to produce hydrogenated product identified in Table II. The first material treated was a heavy cycle stock derived from catalytic cracking in a moving bed operation over conventional silica-alumina amorphous catalyst. The second stock was a gas oil produced in the coking of residual oil stock.

TABLE II.—CATALYTIC HYDROGENATION OF CATALYTIC HEAVY CYCLE STOCK AND HEAVY COKER GAS OIL

|  | Example | |
|---|---|---|
|  | 1 | 2 |
| Yields, percent of charge | Catalytic heavy cycle stock | Heavy coker gas oil |
| Heavy naphtha, vol | 1.1 | 4.6 |
| Gas oil, vol | 19.5 | 18.4 |
| Bottoms, vol | 80.7 | 77.8 |

| Properties of stocks | Charge | Liquid product | Charge | Liquid product |
|---|---|---|---|---|
| Gravity, °API | 14.7 | 20.0 | 20.2 | 27.9 |
| Aniline no, ° F | 155 | 144 | 163 | 168 |
| Sulfur, percent wt | 1.27 | 0.08 | 1.39 | 0.09 |
| Nitrogen, percent wt | 0.06 | 0.012 | 0.27 | 0.08 |
| CCR, percent wt | 1.12 | 0.27 | 0.03 | 0.02 |
| Hydrogen, percent wt | 10.02 | 10.87 | 11.28 | 12.20 |

|  | Example | |
|---|---|---|
|  | 1 | 2 |
| Distillation, VA ° F.: | | | | |
| IBP | 506 | ¹211 | 460 | ¹198 |
| 10% | 699 | 601 | 709 | 543 |
| 30% | 727 | 693 | 777 | 701 |
| 50% | 755 | 729 | 807 | 758 |
| 70% | 794 | 767 | 835 | 800 |
| 90% | 864 | 834 | 879 | 855 |

¹ Atmosphere.

The partially hydrogenated liquid products of Table II, and also the raw gas oils were cracked over a conventional amorphous silica-alumina catalyst, and also over a composite catalyst, consisting of about 3.5 wt. percent of REX material (containing about 25 wt. percent of rare-earth metals as oxides). The composite catalyst had been used extensively in cyclic gas oil catalytic cracking and catalyst regeneration operations and was identified to have only about 1.10 relative hydrogen transfer selectivity as compared to 46 AI silica-alumina.

The conditions of cracking were as follows: Average still further improved conversion efficiency in the second case.

The improvement in hydrogen transfer reaction and the effect of hydrogen donors is further demonstrated by experiments with a virgin gas oil and with that gas oil plus Tetralin added as a hydrogen donor over the same catalysts, at the following conditions: Average reactor temperature 900° F., liquid hourly space velocity 0.8; catalyst to oil ratio (volume) 2. The gas-oil tetralin mix was 75 percent gas oil, 25 percent tetralin. The data obtained from these experiments are presented in Table V.

TABLE V

| Catalyst, charge | Silica-alumina | | REX | |
|---|---|---|---|---|
| | Gas oil | 75% gas oil, 25% tetralin | Gas oil | 75% gas oil, 25% tetralin |
| Conversion vol. percent | 35.2 | 32.2 | 36.9 | 46.0 |
| Cycle above gasoline vol. percent | 64.8 | 67.8 | 53.1 | 54.0 |
| C$_4$ free gasoline vol. percent | 25.6 | 23.1 | 28.0 | 34.8 |
| Coke wt. percent | 2.0 | 1.0 | 5.1 | 1.1 |
| Conversion efficiency | 72.8 | 71.5 | 75.7 | 78.5 |
| Wt. percent coke/vol. percent gasoline | .078 | .043 | .182 | .032 |

Reactor temperature 900° F., liquid hourly space velocity 2, catalyst to oil ratio (volume) 4.

The data obtained are presented in Table III.

While conversion efficiencies are of the same order of magnitude, it is to be specifically noted that a notable decrease in relative coke make occurs with hydrogenated TABLE III.—CRACKING OF RAW AND HYDROTREATED HEAVY COKER AND CATALYTIC HEAVY CYCLE STOCKS

| | Heavy coker gas oil | | | | | | | |
|---|---|---|---|---|---|---|---|---|
| | Raw silica-alumina | | Hydro-treated silica-alumina | | Raw REX | | Hydro-treated catalyst | |
| Catalyst | Percent vol. | Percent wt. | Percent vol. | Percent wt. | Percent vol. | Percent wt. | Percent vol. | Percent wt. |
| Conversion | 26.7 | | 40.1 | | 48.6 | | 65.4 | |
| Cycle above gasoline | 73.2 | 73.5 | 59.9 | 62.1 | 51.4 | 53.2 | 34.6 | 37.6 |
| C$_4$ free gasoline | 19.4 | 16.0 | 30.5 | 26.3 | 31.5 | 25.5 | 47.0 | 40.1 |
| C$_4$ | 4.6 | 2.9 | 8.1 | 5.4 | 11.4 | 7.1 | 15.9 | 16.4 |
| Dry gas | | 3.5 | | 4.2 | | 6.6 | | 7.4 |
| Coke | | 4.2 | | 2.0 | | 7.6 | | 4.6 |

| | Catalytic heavy cycle stock | | | | | | | |
|---|---|---|---|---|---|---|---|---|
| | Raw silica-alumina | | Hydro-treated silica-alumina | | Raw REX | | Hydro-treated catalyst | |
| Catalyst | Percent vol. | Percent wt. | Percent vol. | Percent wt. | Percent vol. | Percent wt. | Percent vol. | Percent wt. |
| Conversion | 27.2 | | 33.6 | | 46.7 | | 49.5 | |
| Cycle above gasoline | 72.8 | 74.3 | 66.4 | 69.0 | 53.3 | 55.5 | 50.5 | 52.9 |
| C$_4$ free gasoline | 14.8 | 11.7 | 21.8 | 17.8 | 25.2 | 19.4 | 33.4 | 26.9 |
| C$_4$ | 4.4 | 2.7 | 7.1 | 4.5 | 10.6 | 6.4 | 11.7 | 7.3 |
| Dry gas | | 3.5 | | 4.2 | | 6.2 | | 5.7 |
| Coke | | 7.9 | | 4.5 | | 12.6 | | 7.3 |

In analyzing the above data, it should be noted that these stocks, both raw and hydrogenated, are very refractory when compared to more conventional cracking feed stocks as indicated by the relatively low conversions.

Furthermore, the conversion efficiency of the operations should be noted, remembering that conversion efficiency is defined as C$_4$ free gasoline, divided by charge minus effluent material boiling above gasoline. The data obtained are presented in Table IV.

stock. Moreover, the catalyst with high hydrogen transfer selectivity results in a sizeable increase in conversion, in the presence of the donor, while the more conventional amorphous silica-alumina catalyst actually showed a loss in conversion. On the other hand, the use of hydrogen donor with special crystalline aluminosilicate catalyst actually resulted in a five fold decrease in coke production.

TABLE IV

| | Heavy coker gas oil | | | | | Heavy cycle stock | | | | |
|---|---|---|---|---|---|---|---|---|---|---|
| | Conv. | Gasoline | Coke | Coke gasoline | Conv. eff. | Conv. | Gasoline | Coke | Coke gasoline | Conv. eff. |
| Raw: | | | | | | | | | | |
| Silica-alumina | 26.7 | 19.4 | 4.2 | .266 | 72.5 | 27.2 | 14.8 | 7.9 | .535 | 54.3 |
| REX | 48.6 | 31.5 | 7.6 | .242 | 64.7 | 46.7 | 25.2 | 12.6 | .500 | 53.9 |
| Hydro-treated: | | | | | | | | | | |
| Silica-alumina | 40.1 | 30.5 | 2.0 | .065 | 76 | 33.6 | 21.8 | 4.5 | .206 | 64.5 |
| REX | 65.4 | 47.0 | 4.6 | .098 | 72 | 49.5 | 33.4 | 7.3 | .218 | 67.8 |

It is to be noted from these data that the creation of hydrogen donors as part of the feed stream and the use of a catalyst containing material of exceptional hydrogen transfer capacity allowed a nearly two and one half fold increase in conversion at the same conversion efficiency in one case, and a near doubling in conversion with a Table VI following presents other comparative data obtained when cracking hydrogenated gas oils with conventional amorphous silica-alumina catalysts and superactive crystalline catalysts as described herein, having high hydrogen transfer selectivity.

TABLE VI
[Hydrogenated Mid-Continent Gas Oil]

| Catalyst | Conversion | Gasoline vol., percent | Coke wt., percent | Coke/ Gasoline | Conversion efficiency |
|---|---|---|---|---|---|
| Silica-alumina | 40.0 | 28.9 | 0.6 | .027 | 72.2 |
|  | 45.4 | 36.4 | 1.5 | .041 | 80.5 |
|  | 51.7 | 33.7 | 1.9 | .056 | 65.0 |
| REX 5% | 66.5 | 53.2 | 0.3 | .056 | 80.0 |
| REX 10% | 74.9 | 58.7 | 1.0 | .017 | 78.5 |
| REHX (steamed) | 83.7 | 65.7 | 4.8 | .073 | 78.5 |
| [Hydrogenated GUICO Gas Oil] | | | | | |
| Silica-alumina | 72.2 | 49.0 | 5.3 | .108 | 67.8 |
| REHX 10% | 72.5 | 60.7 | 2.3 | .038 | 83.6 |

In Table VI, the amorphous silica-alumina catalyst employed had a 46 AI by the Cat. A test. The material designated REHX (steamed) in the above Table VI is that material so designated in Table I. The material designated REX 5% in Table VI is that material designated as Steamed REX Bead in Table I. The material designated REX 10% in Table VI is similar to "Steamed REX Bead" of Table I, but contains more of the superactive material in the composite.

From the above Table VI, the superiority of the superactive crystalline materials over an amorphous silica-alumina catalyst is clearly shown, and particular attention is drawn to the superior capability of materials having a relative hydrogen transfer selectivity greater than 1.25.

It is clear that the process of this invention involves the catalytic cracking of hydrocarbons in the presence of hydrogen donor materials and catalysts having a high hydrogen transfer selectivity. Furthermore, by virtue of this invention there is achieved cracking of gas oils to desired product with a heretofore unobtainable combination of high conversion, low coke make and excellent product distribution. For purposes of more clearly defining this invention the concept of hydrogen transfer selectivity and relative hydrogen transfer selectivity have been introduced and fully described. The catalysts which may be employed in the practice of this invention must possess a relative hydrogen transfer selectivity of at least 1 and preferably 1.25. A particularly preferred group of catalysts which may be employed in the process of this invention are the zeolitic aluminosilicates having an ordered internal structure and a pore diameter of greater than 5 Angstrom units and a relative hydrogen transfer selectivity of at least 1.25.

The requirement for a pore diameter greater than 5 angstrom units is based on the need for sufficient diameter to allow the reactants to pass into the aluminosilicates and the products to pass out. When employing hydrogen donor materials of an aromatic-naphthenic nature, the molecules are of such size as to necessitate fairly large pore diameters in the aluminosilicates. The process of the invention requires that the catalyst be of such nature as to permit free ingress of the reactants to the catalyst sites and free egress of products therefrom. As shown in the data herein presented, not all aluminosilicates of ordered internal structure possess sufficiently high relative hydrogen transfer selectivity, and those which appear most suitable comprise the aluminosilicates which have been produced by a process involving ion-exchange with metal cations possessing a positive valence of at least 2, hydrogen or ammonium ions.

Although the present invention has been described in conjunction with preferred embodiments, it is to be understood that modifications and variations may be resorted to, without departing from the spirit and scope thereof, as those skilled in the art will readily understand. Such variations and modifications are considered to be within the purview and scope of the appended claims.

What is claimed is:

1. A method for cracking hydrocarbons boiling above about 400° F. to obtain fractions boiling in the motor fuel oil range which comprises contacting charge stock hydrocarbons in the presence of a hydrogen donor at a temperature of about 550° F. to 1100° F. with a catalyst composition comprising a porous matrix and a crystalline aluminosilicate characterized by:
   (1) being substantially free of hydrogenation activity;
   (2) having a pore diameter greater than 5 angstrom units;
   (3) having a relative hydrogen transfer selectivity of at least 1.0 times greater than that of an amorphous silica-alumina catalyst having an AI value of about 46;

and thereafter recovering a hydrocarbon conversion product boiling in the motor fuel oil range, said hydrogen donor being a member selected from the group consisting of:
   (a) hydrogen donor materials added to the charge stock from external sources, and
   (b) hydrogen donor materials derived by partial hydrogenation of aromatic hydrocarbons in said charge stock.

2. The process of claim 1 wherein the porous matrix is a synthetic silica-alumina gel.

3. The process of claim 1 wherein the porous matrix is selected from the group consisting of natural clay, chemically treated clay and calcined clay.

4. The process of claim 3 wherein the porous matrix is selected from the group consisting of natural halloysite, chemically treated halloysite and calcined halloysite.

5. A method for cracking hydrocarbons boiling above about 400° F. to obtain fraction boiling in the motor fuel oil range which comprises contacting charge stock hydrocarbons in the presence of a hydrogen donor at a temperature of about 550° F. to 1100° F. with a catalyst composition comprising a porous matrix and a crystalline aluminosilicate characterized by:
   (1) being substantially free of hydrogenation activity;
   (2) having a pore diameter greater than 5 angstrom units;
   (3) having a relative hydrogen transfer selectivity of at least 1.0 times greater than that of an amorphous silica-alumina catalyst having an AI value of about 46;
   (4) having a silicon to aluminum ratio greater than 1.8;
   (5) which has been base exchanged with a cation selected from the group of hydrogen ions, rare earth ions, ammonium ions and mixtures thereof;

and thereafter recovering a hydrocarbon conversion product boiling in the motor fuel oil range, said hydrogen donor being a member selected from the group consisting of:
   (a) hydrogen donor materials added to the charge stock from external sources, and
   (b) hydrogen donor materials derived by partial hydrogenation of aromatic hydrocarbons in said charge stock.

6. The process of claim 5 wherein the porous matrix is a synthetic silica-alumina gel.

7. The process of claim 5 wherein the porous matrix is selected from the group consisting of natural clay, chemically treated clay and calcined clay.

8. The process of claim 7 wherein the porous matrix is selected from the group consisting of natural halloysite, chemically treated halloysite and calcined halloysite.

9. A method for cracking hydrocarbons boiling above about 400° F. to obtain fractions boiling in the motor fuel oil range which comprises contacting charge stock hydrocarbons selected from the group consisting of virgin gas oils, heavy coker gas oils and catalytic heavy cycle stocks in the presence of a hydrogen donor at a temperature of about 550° F. to 1100° F. with a catalyst composition comprising a porous matrix and a crystalline aluminosilicate characterized by:
   (1) being substantially free of hydrogenation activity;
   (2) having a pore diameter greater than 5 Angstrom units;
   (3) having a relative hydrogen transfer selectivity of at least 1.0 times greater than that of an amorphous silica-alumina catalyst having an AI value of about 46;
and thereafter recovering a hydrocarbon conversion product boiling in the motor fuel oil range, said hydrogen donor being a member selected from the group consisting of:
   (a) hydrogen donor materials added to the charge stock from external sources, and
   (b) hydrogen donor materials derived by partial hydrogenation of aromatic hydrocarbons in said charge stock.

10. A method for cracking hydrocarbons boiling above about 400° F. to obtain fractions boiling in the motor fuel oil range which comprises contacting charge stock hydrocarbons selected from the group consisting of virgin gas oils, heavy coker gas oils and catalytic heavy cycle stocks in the presence of a hydrogen donor at a temperature of about 550° F. to 1100° F. with a catalyst composition comprising a porous matrix and a crystalline aluminosilicate characterized by:
   (1) being substantially free of hydrogenation activity;
   (2) having a pore diameter greater than 5 Angstrom units;
   (3) having a relative hydrogen transfer selectivity of at least 1.0 times greater than that of an amorphous silica-alumina catalyst having an AI value of about 46;
   (4) having a silicon to aluminum ratio greater than 1.8;
   (5) which has been base exchanged with a cation selected from the group of hydrogen ions, rare earth ions, ammonium ions and mixtures thereof;
and thereafter recovering a hydrocarbon conversion product boiling in the motor fuel oil range, said hydrogen donor being a member selected from the group consisting of:
   (a) hydrogen donor materials added to the charge stock from external sources, and
   (b) hydrogen donor materials derived by partial hydrogenation of aromatic hydrocarbons in said charge stock.

References Cited

UNITED STATES PATENTS

| | | | |
|---|---|---|---|
| 3,140,251 | 7/1964 | Plank et al. | 208—120 |
| 3,413,212 | 11/1968 | Weisz | 208—56 |

DELBERT E. GANTZ, Primary Examiner

A. RIMENS, Assistant Examiner

U.S. Cl. X.R.

208—111, 120

PO-1050
(5/69)

UNITED STATES PATENT OFFICE
CERTIFICATE OF CORRECTION

Patent No. 3,533,936          Dated October 13, 1970

Inventor(s) Paul B. Weisz

It is certified that error appears in the above-identified patent and that said Letters Patent are hereby corrected as shown below:

Column 1, line 26, "U.S. 3,413,212" should read --U.S. 3,412,212--. Column 2, line 27, "generating" should read --regenerating--. Column 2, line 32, "per se" should read --per se--. Column 4, line 17, "5A." should read --5Å--. Column 4, line 18, "10-13A." should read --10-13Å--. Column 7, line 73, "pentene" should read --pentane--. Column 12, Table III, heading Heavy coker gas oil, under heading Hydro-treated catalyst, sub-heading (2nd occurrence) Percent wt., under C4, "16.4" should read --10.4--. Column 12, Table IV, heading Heavy cycle stock, under heading Conv. eff., under Silica-Alumina, "64.5" should read --64.8--. Column 12, Table IV, heading Heavy cycle stock, under heading Conv. eff., under REX, "67.8" should read --67.5--. Column 12, Table V, heading REX, under heading Gas oil, under Cycle above gasoline vol. percent, "53.1" should read --63.1--. Column 12, Table V, heading REX, under heading 75% gas oil, 25% tetralin, under Conversion efficiency, "78.5" should read --75.5--.

Signed and sealed this 22nd day of June 1971.

(SEAL)
Attest:

EDWARD M. FLETCHER, JR.
Attesting Officer

WILLIAM E. SCHUYLER, JR.
Commissioner of Patents